United States Patent
Ooi et al.

(10) Patent No.: US 7,544,888 B2
(45) Date of Patent: Jun. 9, 2009

(54) WATERTIGHT AND NONWATERTIGHT ELECTRICAL JUNCTION BOX

(75) Inventors: Seiji Ooi, Yokkaichi (JP); Eiji Higuchi, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 11/979,523

(22) Filed: Nov. 5, 2007

(65) Prior Publication Data

US 2008/0105450 A1 May 8, 2008

(30) Foreign Application Priority Data

Nov. 6, 2006 (JP) ............... 2006-300613

(51) Int. Cl.
*H02G 3/08* (2006.01)
(52) U.S. Cl. ............... 174/50; 174/53; 174/58; 174/64; 174/135; 439/535; 248/906; 361/600; 385/135
(58) Field of Classification Search ........... 174/50, 174/53, 58, 64, 135; 220/3.2, 4.02; 439/535; 248/906; 361/600, 601; 385/135
See application file for complete search history.

(56) References Cited

U.S. PATENT DOCUMENTS

| | | | | |
|---|---|---|---|---|
| 3,289,051 A | * | 11/1966 | Sloan | ............... 361/519 |
| 5,703,734 A | * | 12/1997 | Berberich et al. | ........ 360/97.02 |
| 6,201,922 B1 | * | 3/2001 | Milanowski et al. | ........ 385/135 |
| 6,239,368 B1 | * | 5/2001 | Gretz | ............... 174/57 |
| 7,183,483 B1 | * | 2/2007 | Anderson et al. | ............. 174/50 |
| 7,186,912 B2 | * | 3/2007 | Guan et al. | ............... 174/50 |
| 7,294,017 B2 | * | 11/2007 | Scott | ............... 439/535 |

FOREIGN PATENT DOCUMENTS

| | | |
|---|---|---|
| JP | A 2004-087739 | 3/2004 |
| JP | A 2004-158338 | 6/2004 |

* cited by examiner

*Primary Examiner*—Dhiru R Patel
(74) *Attorney, Agent, or Firm*—Oliff & Berridge, PLC

(57) ABSTRACT

An electrical junction box can be used as both a watertight type and a nonwatertight type by improving a fitting structure between a cover and a casing and restricting the cover and casing from rattling even in the nonwatertight configuration in which a rubber packing is not mounted on the box. An electrical junction box that can be used as a watertight type and a nonwatertight type includes a casing and a cover. Terminals connected to ends of electrical wires may be contained in the casing. The electrical wires may be drawn out from a bottom of the casing. An electrical element may be detachably connected to the casing through an upper opening in the casing to be coupled to the terminals. The cover is joined to the casing. A pair of clearance-filling ribs, which have recessed configuration in section, project from one side of a peripheral wall of the cover toward the casing. The casing is provided on an outer surface with fitting ribs adapted to engage the clearance-filling ribs. Engagement of the clearance-filling ribs and the fitting ribs can restrict the rattling, in the case where a rubber packing is not mounted on an inner surface of the peripheral wall of the cover to form the nonwatertight configuration.

4 Claims, 10 Drawing Sheets

WATERTIGHT AND NONWATERTIGHT ELECTRICAL JUNCTION BOX

This application claims priority from Japanese Patent Application Number JP-2006-300613 filed on Nov. 6, 2006, the entire contents of which are incorporated herein by reference.

BACKGROUND

Embodiments of the invention relate to an electrical junction box, and more particularly relate to an electrical junction box that can be used as both a watertight type and a nonwatertight type by attaching and detaching a rubber packing to the electrical junction box.

In the case where an electrical junction box connected to a wire harness is mounted on a motor vehicle inside an engine room or the like and is not exposed outside, the electrical junction box is generally of the nonwatertight type. On the other hand, in the case where an electrical junction box connected to a wire harness is mounted on a motor vehicle outside an engine room or the like and is exposed outside, the electrical junction box is generally of the watertight type.

In the watertight type electrical junction box, in order to prevent water from entering a clearance between a cover and a casing, the cover and casing must be interconnected through a sealing material. Consequently, there were some problems in the prior art. Specifically, a watertight type electrical junction box differs from a nonwatertight type electrical junction box with respect to structure. Additionally, the watertight type and nonwatertight type electrical junction boxes cannot have the same use, even if they have the same kind of function. Furthermore, costs of dies, the number of parts, and controlling steps are increased.

Thus, as shown in Patent Document 1 (JP 2004-877394), a containing box assembly for an electrical control device shown in FIGS. 10A and 10B is a watertight type junction box. The containing box assembly comprises an outer box 1 and a lid 2 for closing the outer box 1. The lid 2 is provided in a whole periphery on an opening end edge with a groove 2a that receives a seal material 3 for sealing the containing box assembly.

The sealing material 3 is pushed into the groove 2a to mechanically join the sealing material 3 to the lid 2. An upper opening end 1a of the outer box 1 is fitted in the groove 2a with the sealing material 3 being press-fitted in the groove 2a. By deforming the sealing material 3 so that the material 3 fills a clearance between the upper opening end 1a and the lid 2, a sealing function is kept for a long period in time in the containing box assembly for the electrical control device.

However, in the case where the containing box assembly for the electrical junction box is used as a nonwatertight electrical junction box, the sealing material 3 is not required. Consequently, a clearance between the groove 2a in the lid 2 and the upper opening end 1a is created where the sealing material 3 is no longer present. Accordingly, this clearance creates various problems. For example, the lid 2 on the outer box 1 rattles in the clearance and thereby generates noise during vehicle travel. Additionally, this rattling increases the probability of the lid 2 or the outer box 1 being damaged or broken during vehicle travel.

Therefore, the containing box assembly for the electrical control device disclosed in Patent Document 1 cannot effectively be used for both watertight and nonwatertight applications.

SUMMARY

In view of the above problems, an object of embodiments of the present invention is to provide an electrical junction box that can be used as a watertight type and a nonwatertight type. Specifically, a fitting structure is provided between a cover and a casing to significantly reduce rattling between the cover and casing, even in the nonwatertight type in which a rubber packing is not mounted on the box.

In order to overcome the above problems, the embodiments of the present invention include an electrical junction box having a casing and a cover that can be used as a watertight type and a nonwatertight type. Terminals connected to ends of electrical wires are contained in the casing, and the electrical wires may be drawn out from a bottom of the casing. An electrical element is detachably connected to the casing through an upper opening in the casing to be coupled to the terminals. The cover is joined to the casing. A pair of clearance-filling ribs, which have a recessed configuration in section view, project from one side of a peripheral wall of the cover toward the casing. The casing is provided on an outer surface with fitting ribs adapted to engage the clearance-filling ribs. Engagement of the clearance-filling ribs and the fitting ribs can reduce or prevent rattling when a rubber packing is not mounted on an inner surface of the peripheral wall of the cover to form the nonwatertight type electrical junction box.

In the case where the electrical junction box is used as a watertight type, the rubber packing is mounted on the inner surface of the cover. When the cover is put on the casing, the rubber packing is elastically deformed to fill the clearance between the cover and the casing, thereby enhancing a sealing function. On the other hand, in the case where the electrical junction box is used as a nonwatertight type, since the cover is put on the casing without mounting the rubber packing on the cover, a clearance is defined between the casing and the cover in the electrical junction box instead of the space to be filled with the rubber packing.

Even in the case where an electrical junction box of the present invention is used as a nonwatertight type without mounting the rubber packing on the cover, since the clearance filling-ribs of the casing are engaged with the fitting ribs of the cover, it is possible to reduce or prevent rattling caused by the clearance between the casing and the cover, to suppress noise, and to reduce the possibility of the casing and cover being broken or damaged.

Also, since an electrical junction box of the present invention can be used as a watertight type and a nonwatertight type, as described above, it is not necessary to prepare two kinds of watertight type and nonwatertight type electrical junction boxes, thereby reducing costs.

Preferably, but not necessarily, the clearance-filling ribs are provided on said cover at the opposite sides of a lock piece with a clearance. The lock piece is provided on the cover for locking the casing.

According to the above structure, since the clearance-filling ribs can reduce or prevent rattling between the casing and the cover, it is possible to reduce the possibility of the lock piece of the casing being broken.

In some embodiments, a tongue piece projects toward the casing from a side opposed to the side of the cover on which the lock piece and clearance-filling ribs are provided. A frame portion projects from an outer surface of the casing opposed to the tongue piece to enter the tongue piece with a clearance. When air pressure in an internal space sealed by locking engagement between the cover and the casing increases, the tongue piece is displaced in the frame portion to form a clearance for exhausting the internal air between the cover and the casing.

In the case of the watertight type electrical junction box, since the rubber packing is mounted on the cover, the sealing function is increased. When the electrical junction box is exposed to a high temperature, a temperature in the electrical junction box increases and the internal air pressure also increases. In the above case, since the casing and cover are joined at one side, a force acts on the cover to open the cover around the one side.

In embodiments of the present invention, even if the internal air pressure increases to expand the internal air, since the tongue piece of the cover is caught on the frame portion of the casing, the cover will not be opened, thereby preventing the sealing function from being lowered due to an excessive internal air pressure in the electrical junction box. Also, since the tongue piece of the cover is displaced in the frame portion to exhaust the expanded air in the electrical junction box, it is possible to reduce or prevent deformation of the cover and casing due to the excessive internal air pressure while at the same time maintaining the sealing function.

Preferably, but not necessarily, the casing is provided with an electrical element-containing section in which a watertight treatment is applied to the terminals connected to the ends of the electrical wires. An electrical element including a single fuse or relay may be accommodated in the electrical element-containing section.

According to the above structure, since only one fuse or relay is contained, the electrical junction box will have a length of from about 40 millimeters (mm) to about 60 mm. Since it is possible to adjust the number of fuses or relays when a large size electrical junction box, such as a junction box or a relay box, is diverted to different kinds of vehicles, general versatility can be enhanced.

Since embodiments of the electrical junction box of the present invention are small in size, it is possible to mount them in a limited space in a vehicle. Furthermore, two or more of the electrical junction boxes may be coupled to one another or a single electrical junction box may be mounted on a vehicle.

A rubber plug may be attached to the terminal to carry out a watertight treatment of the terminals connected to the ends of the electrical wires.

As described above, even in the case where embodiments of an electrical junction box are used as a nonwatertight type without mounting the rubber packing on the cover, since the clearance-filling ribs of the casing engage the fitting ribs of the cover, it is possible to reduce or prevent rattling due to the clearance between the casing and the cover. Consequently, it is possible to suppress noise and to reduce the possibility of the casing and cover being broken or damaged.

Also, in embodiments, even if the internal air pressure increases in the electrical junction box, since the tongue piece of the cover is caught on the frame portion of the casing, the cover will not be opened and the excessive internal air pressure in the electrical junction box will not lower the sealing function. Furthermore, since the tongue piece of the cover is displaced in the frame portion of the casing to exhaust the expanded air in the electrical junction box, it is possible to reduce or prevent deformation of the cover and casing due to the excessive internal air in the electrical junction box.

As described above, since embodiments of the invention can be used as a watertight type or a nonwatertight type by attaching and detaching the rubber packing to the cover, it is unnecessary to design two kinds of watertight and nonwatertight types and it is therefore possible to reduce amortization cost of dies.

BRIEF DESCRIPTION OF THE DRAWINGS

Exemplary embodiments are described below with reference to the drawings, wherein like numerals illustrate like parts.

DETAILED DESCRIPTION

Figure 1:
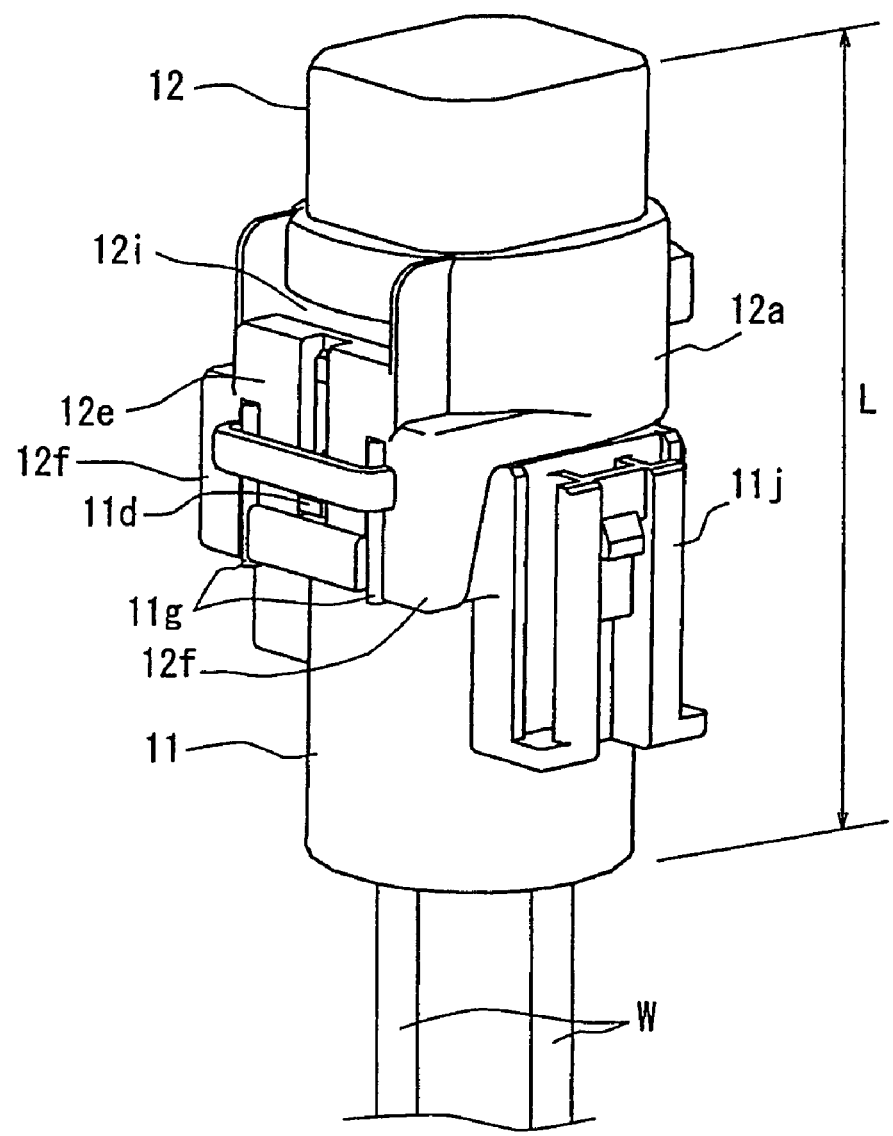
FIG. 1 is a perspective view of a first embodiment of an electrical junction box for a nonwatertight type.

Referring now to the drawings, embodiments of an electrical junction box in accordance with the present invention will be described below.

FIGS. 1 through 6B show a first embodiment of an electrical junction box.

An electrical junction box 10 of the present invention is a combination of watertight and nonwatertight type electrical junction boxes for a vehicle. The electrical junction box 10 includes a casing 1 and a cover 12. The cover 12 is put on and coupled to the casing 11. Electrical wires W are drawn out from a bottom of the casing 11. The electrical junction box 10 in the first embodiment has an overall length L of about 50 millimeters (mm).

Figure 2A:
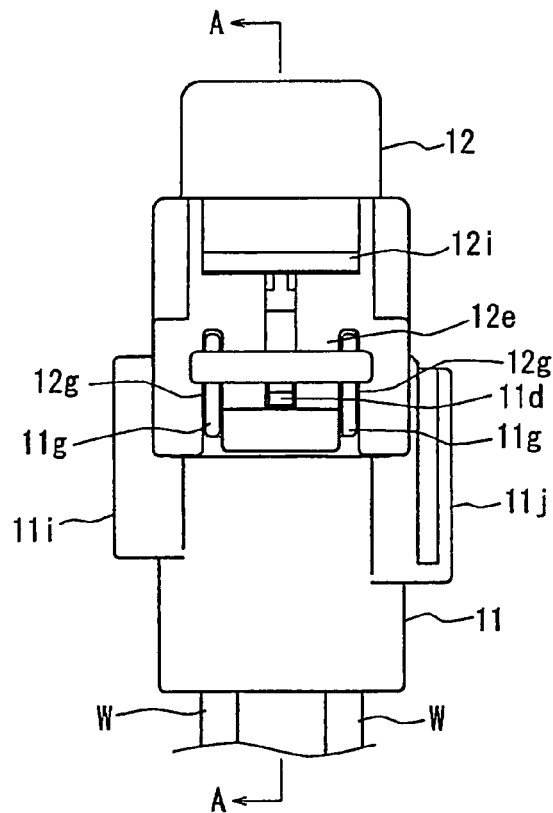
FIG. 2A is a front elevation view of the electrical junction box shown in FIG. 1.
Figure 2B:
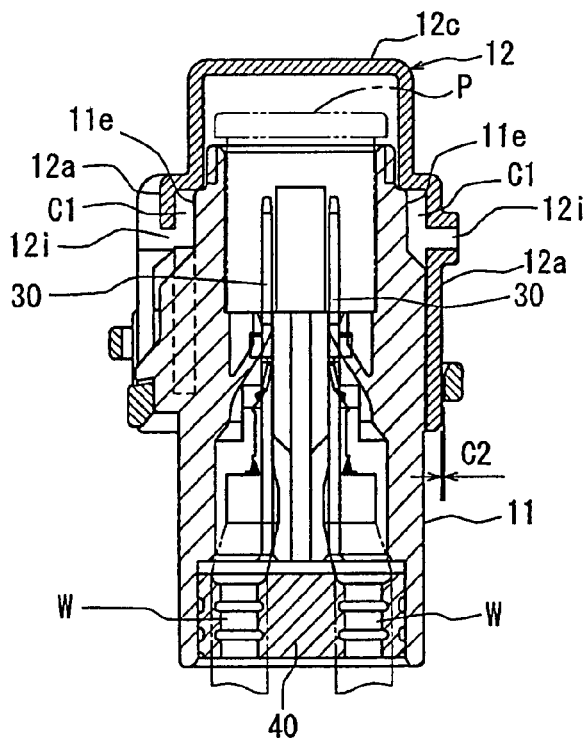
FIG. 2B is a longitudinal section view of the electrical junction box taken along line A-A in FIG. 2A.

As shown in FIG. 2B, a fuse P is contained in the casing 11, and terminals 30 of the electrical wires W are also contained in the casing 11. The fuse P is connected to the terminals 30 of the electrical wires W in the casing 11.

In the case where the electrical junction box 10 is used as a watertight type, a rubber packing 20 (shown in FIGS. 8A and 8B) is attached to the cover 12 and the cover 12 is mounted on and joined to the casing 11.

On the other hand, in the case where the electrical junction box 10 is used as a nonwatertight type, the rubber packing 20 is not attached to the cover 12 and the cover 12 is mounted on and joined to the casing 11.

In the first embodiment, the electrical junction box 10 is a nonwatertight type.

As shown in FIGS. 4A through 5C, an inwardly recessed shoulder 12b is provided on an upper end of a square frame-like peripheral wall 12a of the cover 12. A fuse cover portion 12c, which is slightly smaller than the peripheral wall 12a, protrudes from the shoulder 12b.

Figure 4A:
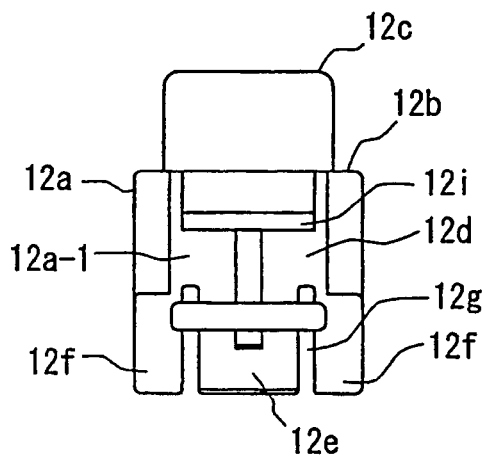
FIG. 4A is a front elevation view of an exemplary cover.
Figure 4B:
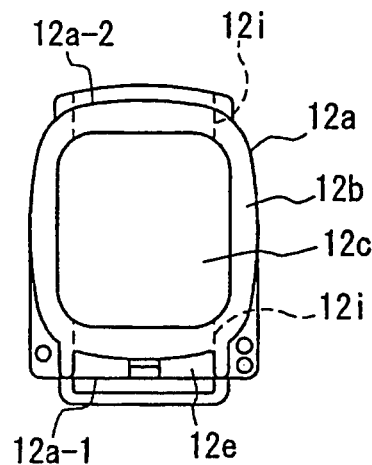
FIG. 4B is a plan view of the cover.
Figure 4C:
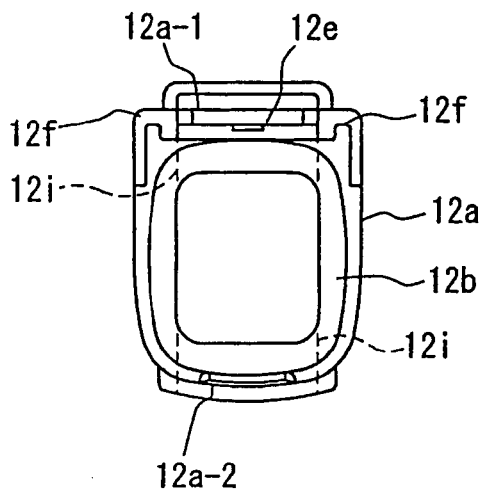
FIG. 4C is a bottom view of the cover.

As shown in FIGS. 4A through 4C, a first side wall 12a-1 of the peripheral wall 12a is provided with a pair of clearance-filling ribs 12f. Each rib 12f has a recessed shape in cross section at the corner and extends from a lower end of the peripheral wall 12a toward the casing 11.

The first side wall 12a-1 is provided on a central part with a lock piece 12e projecting toward the casing 11. The lock piece 12e engages a lock pawl 11d of the casing 11 mentioned below to couple the casing 11 and cover 12 to each other.

Slits 12g extend vertically between the opposite ends of the lock piece 12e and the clearance-filling ribs 12f. The slits 12g are open at the lower ends. Each of reinforcement ribs 11g mentioned below is fitted in a respective one of the slits 12g.

Figure 5A:
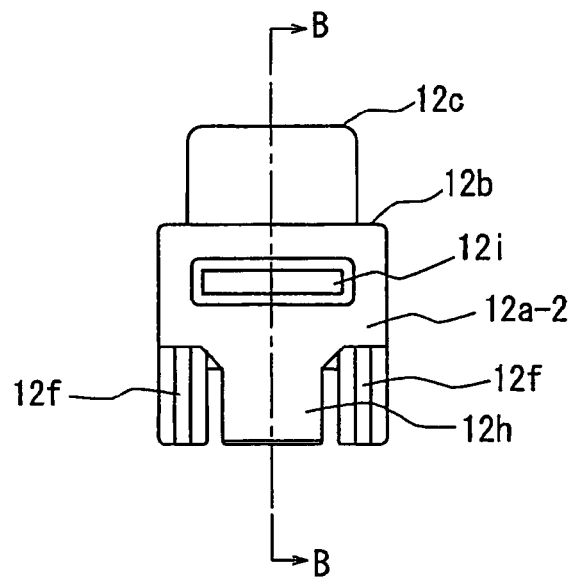
FIG. 5A is a rear side elevation view of an exemplary cover.
Figure 5B:
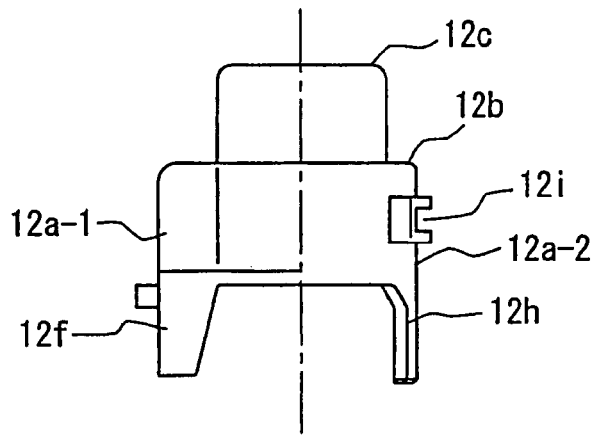
FIG. 5B is a right side elevation view of the cover.
Figure 5C:
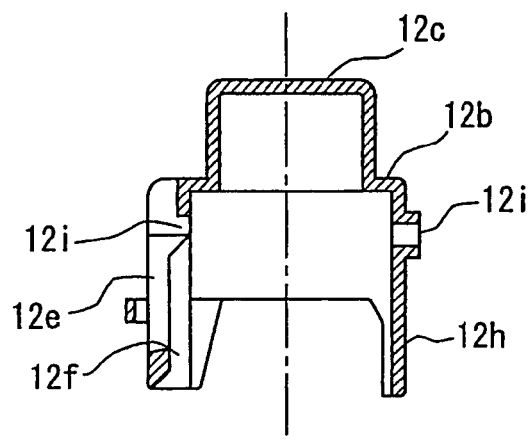
FIG. 5C is a longitudinal section view of the cover taken along line B-B in FIG. 5A.

As shown in FIGS. 5A through 5C, a rectangular plate-like tongue piece 12h extends from a lower end of a second side wall 12a-2 opposed to the first side wall 12a-1 toward the casing 11. The tongue piece 12h is inserted into a frame portion 11h as described below.

The opposed first and second side walls 12a-1 and 12a-2 are provided with engaging rectangular holes 12i for receiving a rubber packing 20 above the lock piece 12e and tongue piece 12h. The holes 12i are arranged at the same position in height with respect to each other. Since the rubber packing 20 is not inserted in the holes 12i in the first embodiment, the holes 12i are shown in an open state in FIGS. 5A through 5C.

Figure 3:
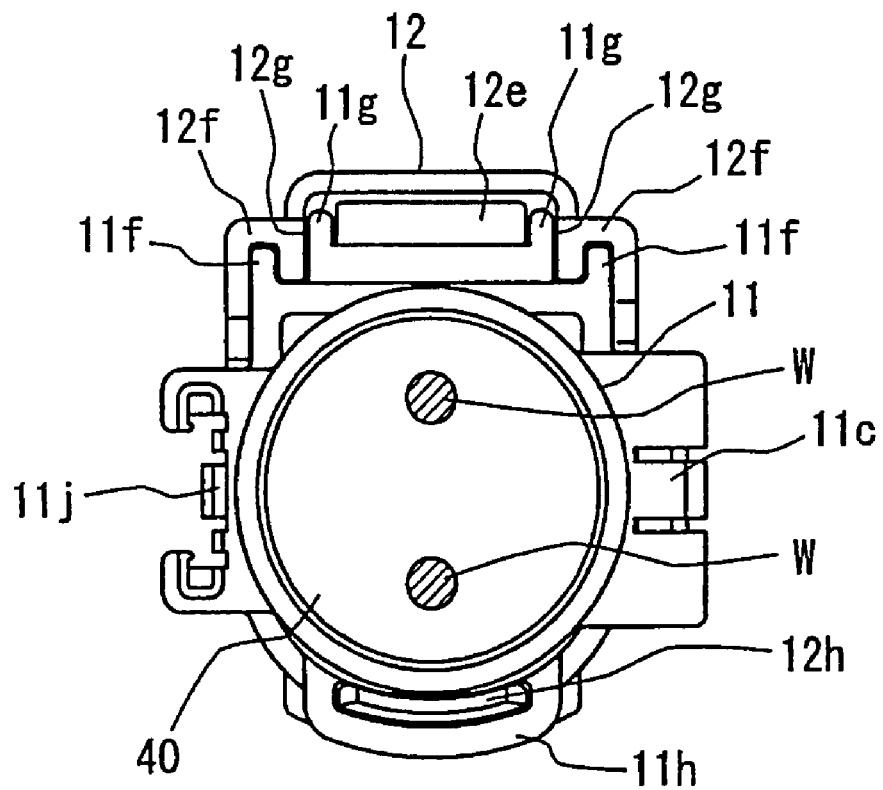
FIG. 3 is a bottom view of the electrical junction box shown in FIG. 1.
Figure 6A:
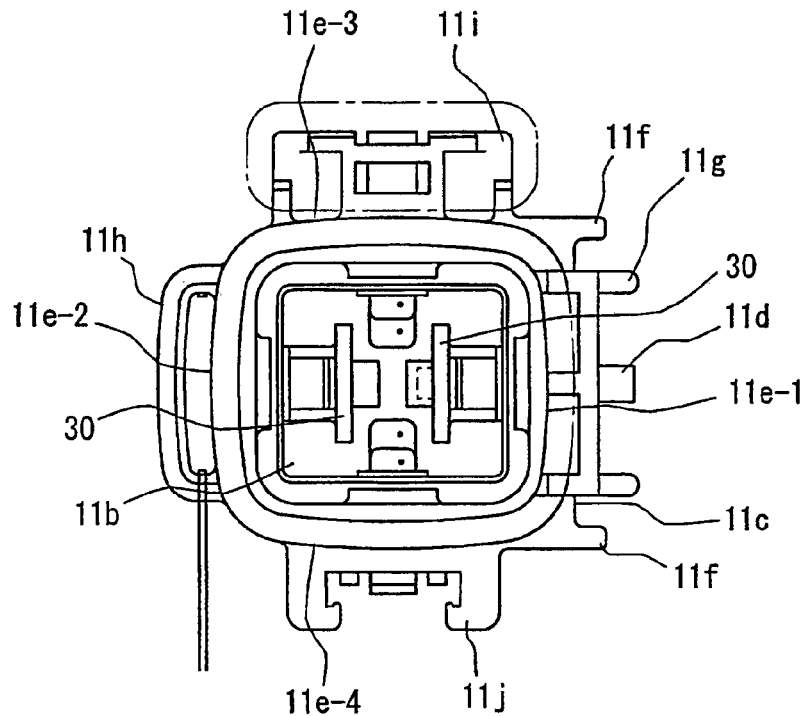
FIG. 6A is a plan view of an exemplary casing.
Figure 6B:
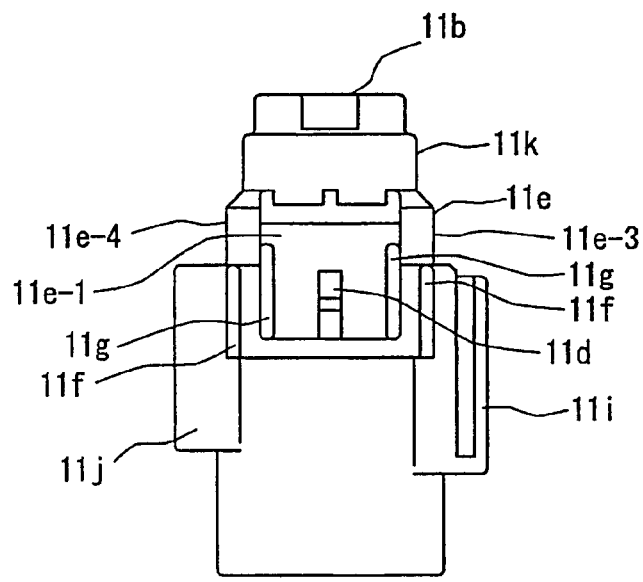
FIG. 6B is a right side elevation view of the casing.

As shown in FIGS. 3, 6A and 6B, the casing 11 is formed into a substantially column configuration and is provided on upper end with a square frame-shaped peripheral wall 11e. While in this embodiment the peripheral wall is square, various other peripheral wall shapes, such as rectangles, polygons, curved shapes, and the like can be used. A rubber plug 40, into which the terminals 30 of the electrical wires W are inserted, is received in the casing 11. The electrical wires W connected to the terminals 30 are drawn out from a bottom of the casing 11. The terminals 30 of the electrical wires W may be molded in the casing 11.

The casing 11 is provided on the upper end with an electrical element-containing section 11b that is open at the upper end. A pair of terminals 30 connected to the electrical wires W project toward the cover 12 in the electrical element-containing section 11b. A fuse P to be connected to the terminals 30 is detachably fitted in the electrical element-containing section 11b.

The peripheral wall 11e is provided on an inner part with a rubber packing receiving peripheral wall 11k that is slightly smaller than the wall 11e. In the case where the rubber packing 20 is mounted on the casing 11, an inner surface of the rubber packing 20 contacts the peripheral wall 11k.

A lock pawl 11d projects from a first side wall 11e-1 of the casing 11 opposed to the first side wall 12a-1 of the cover 12 at the position opposed to the lock piece 12e. A pair of fitting ribs 11f, which extend in a vertical direction, project from both corners of the lock pawl 11d at the position opposed to the clearance-filling ribs 12f of the cover 12. The fitting ribs 11f are closely fitted in the clearance-filling ribs 12f of the cover 12.

A pair of reinforcement ribs 11g, which extend in a vertical direction, are spaced from the fitting ribs 11f at the position opposed to the slits 12g in the casing 11. The fitting ribs 11f are inserted into and fixed in the slits 12g in the cover 12.

Figure 7A:
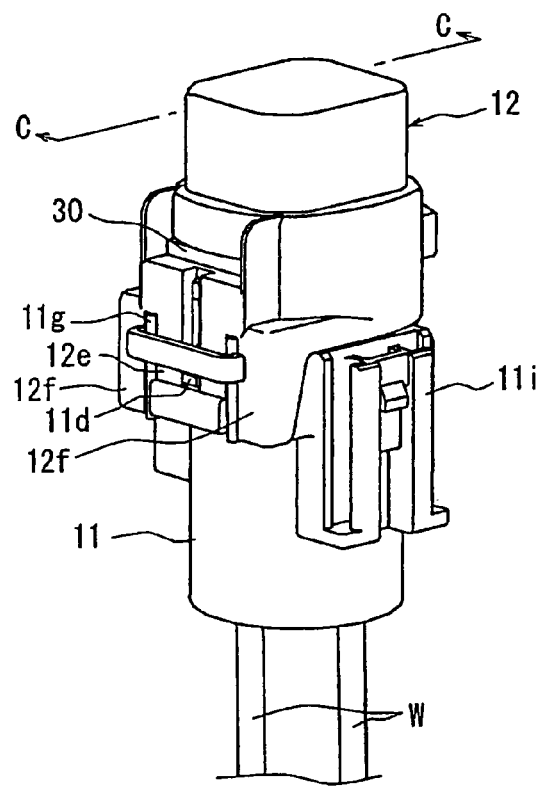
FIG. 7A is a perspective view of a second embodiment of an electrical junction box for a watertight type in accordance with the present invention.
Figure 7B:
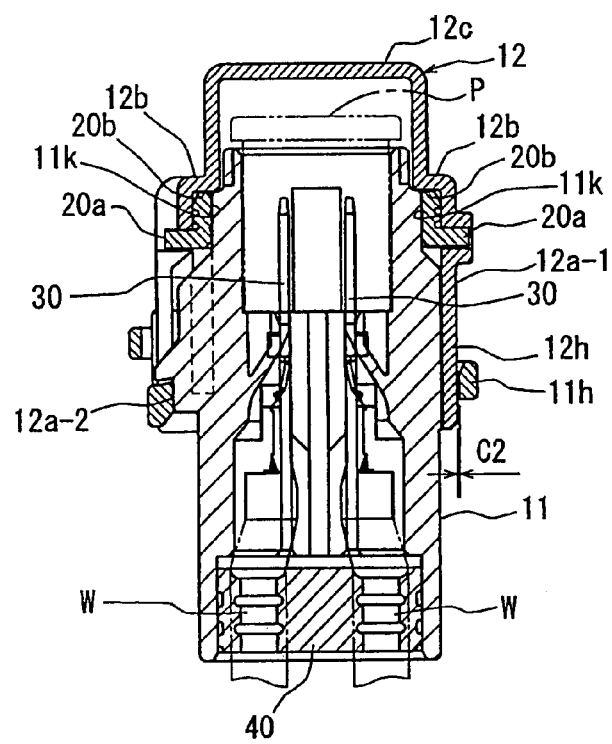
FIG. 7B is a longitudinal section view of the electrical junction box taken along lines C-C in FIG. 7A.

Also, as shown in FIG. 7B, the frame portion 11h projects from an outer surface of a second side wall 11e-2 opposed to the first side wall 11e-1 and enters the tongue piece 12h of the cover 12 with a clearance C2 ("first clearance").

As shown in FIG. 6A, engaged portions 11i and engaging portions 11j are provided on a third side wall 11e-3 and a fourth side wall 11e-4 opposed to each other in order to couple other elements or electrical junction boxes to each other.

As shown in FIGS. 2A and 2B, when the fuse P is accommodated in the electrical element-containing section 11b and the cover 12 and casing 11 are interconnected, a fuse-covering portion 12c of the cover 12 encloses the fuse P and the peripheral wall 12a of the cover 12 is opposed to the peripheral wall 11e of the casing 11. A clearance C1, which will serve to receive the rubber packing 20 in the case of a watertight type use, is defined between the peripheral wall 12a of the cover 12 and the peripheral wall 11e of the casing 11.

As described above, in the case where the electrical junction box 10 of the present invention is used as a nonwatertight type in which the rubber packing 20 is not mounted in the cover 12, it is possible to reduce the rattling or prevent the cover 12 from rattling in the clearance C1 between the casing 11 and the cover 12. This reduction or preventing in rattling is due to the clearance-filling ribs 12f of the cover 12 being engaged with the fitting ribs 11f of the casing 11. Accordingly, it is possible to suppress generation of noise and to reduce the possibility of the casing 11 and cover 12 being damaged or broken.

Also, by providing the reinforcement ribs 11g on the opposite sides of the lock pawl 11d of the casing 11, and fitting the reinforcement ribs 11g in the slits 12g in the cover 12, it is possible to reduce the possibility of the lock pawl 11d of the casing 11 being broken due to displacement between the casing 11 and the cover 12.

Furthermore, since the electrical junction box may contain only one fuse and has a small size, the box can be mounted in a small space. In addition, since the casing 11 is provided with the engaged portions 11i and engaging portions 11j, the electrical junction box can be connected to a vehicle body, other electrical parts, or the like and can be also connected to another electrical junction box. Accordingly, it is possible to adjust the number of fuses and to enhance general versatility.

As described above, since the electrical junction box 10 of the first embodiment can be used as a watertight type and a nonwatertight type by attaching and detaching the rubber packing 20 to the cover, it is unnecessary to design two kinds of watertight and nonwatertight types and it is therefore possible to reduce an amortization cost of dies.

FIGS. 7A through 9 show a second embodiment of an electrical junction box for a watertight type in accordance with the present invention.

The general structure of an exemplary casing 11 and an exemplary cover 12 in the second embodiment are similar to those of the casing 11 and cover 12 in the first embodiment. However, as shown in FIGS. 7A and 7B, a rubber packing 20 is mounted on the cover 12 to seal a clearance C1 between the casing 11 and the cover 12. This structure in the second embodiment is different from that in the first embodiment.

Figure 8A:
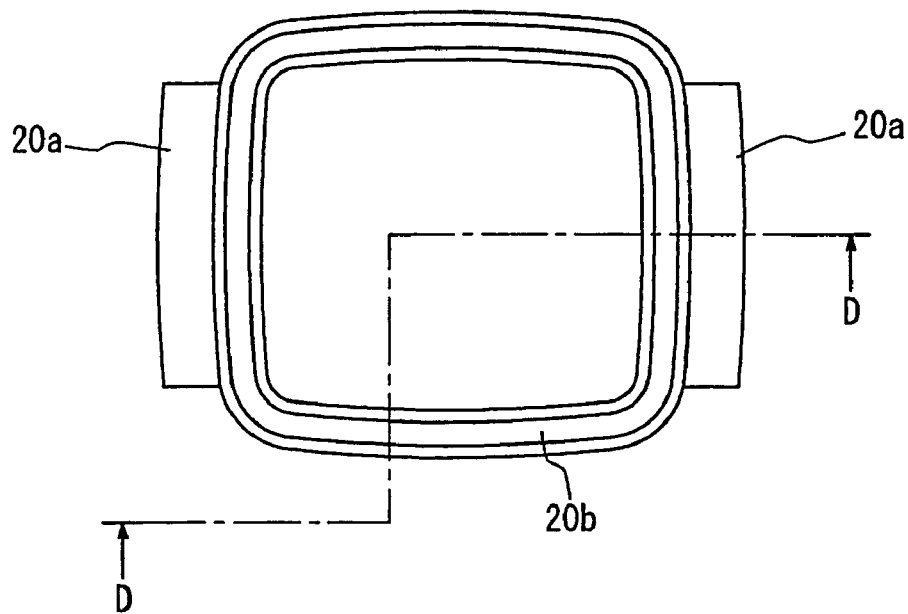
FIG. 8A is a plan view of an exemplary rubber packing.
Figure 8B:
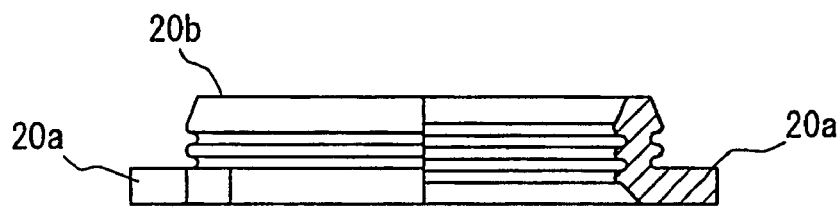
FIG. 8B is a cross section view of the rubber packing taken along line D-D in FIG. 8A.

As shown in FIGS. 8A and 8B, the rubber packing 20 is formed into a square frame like configuration and is made of an elastic material such as a rubber. While the second embodiment utilizes a square configuration, configurations of various other shapes, such as rectangles, polygons, curved shapes, or the like may be used. The rubber packing 20 is provided with engaging portions 20a extending from lower end edges of opposed sides in a horizontal direction. The engaging portions 20a of the rubber packing 20 are inserted into engaging holes 12i in the cover 12. An upper surface 20b of the rubber packing 20 contacts a shoulder 12b of the cover 12. Thus, the rubber packing 20 is mounted on the cover 12.

When the casing 11 and cover 12 are coupled to each other, as shown in FIG. 7B, the upper surface 20b of the rubber packing 20 contacts a shoulder 12b of the cover 12. Additionally, the rubber packing 20 is elastically deformed in the clearance C1 between the rubber packing receiving peripheral wall 11k of the casing 11 and the inner surface of the peripheral wall 12a on the cover 12 so as to fill the clearance C1.

Figure 9:
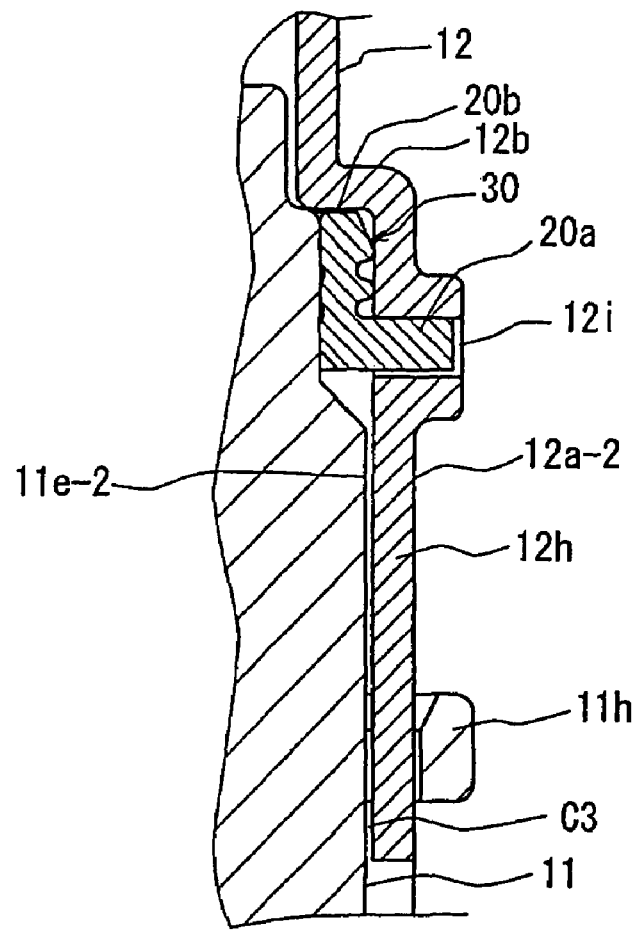
FIG. 9 is a partial section view of the second embodiment of the electrical junction box, illustrating a tongue piece of the cover caught on a frame portion of the casing.
Figure 10A:
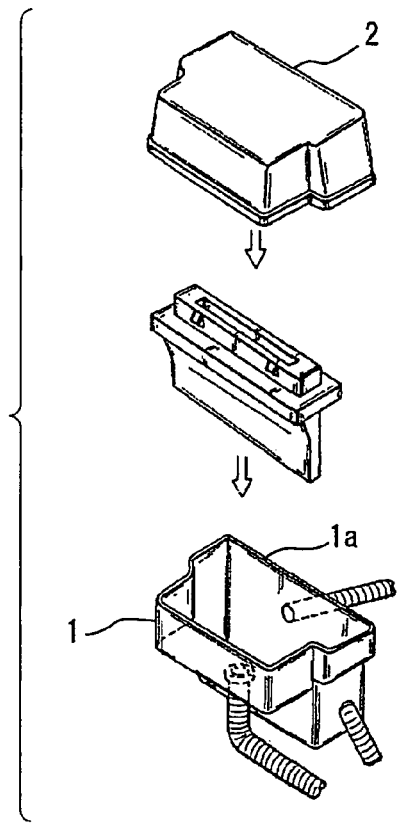
FIG. 10A is an exploded perspective view of a conventional containing box assembly for an electrical control device.
Figure 10B:
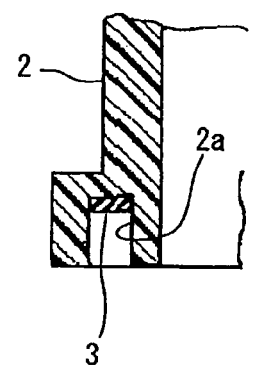
FIG. 10B is a partial section view of a lid.

Thus, the internal space in the watertight type electrical junction box 10 is brought into a sealed state by attachment of the rubber packing 20. When the electrical junction box 10 is sealed, and when the air pressure in the sealed electrical junction box 10 increases, the cover 12 tends to open around the first peripheral wall 12a-1 joined to the casing 11. Then, as shown in FIG. 9, the tongue piece 12h of the cover 12 becomes caught on the frame portion 11h of the casing 11. In addition, a clearance C3 ("second clearance") for exhausting air in the internal space is defined between the cover 12 and the casing 11.

As described above, even if the watertight type electrical junction box 10 is exposed to a high temperature, and thereby experiences an increase in internal pressure, it is possible to restrict the cover 12 from opening and to restrict a sealing function from lowering due to an excessive internal pressure in the electrical junction box 10, since the tongue piece 12h of the cover 12 is caught on the frame portion 11h of the casing 11.

Also, as described above, even if a pressure in the electrical junction box 10 increases and the air is expanded in the box, it is possible to exhaust the air expanded in the electrical junction box 10 through the clearance C3 while maintaining the sealing function, since the tongue piece 12h of the cover 12 is displaced in the frame portion 11h of the casing 11 and the clearance C3 is formed between the cover 12 and the casing 11.

Since the other constructions in the second embodiment are similar to those the first embodiment, an explanation of them will be omitted.

The above-described embodiments are illustrative and not limiting. Various improvements, modifications, substitutes or the like are possible within the spirit and scope of the invention.

What is claimed is:

1. An electrical junction box capable of both a watertight configuration and a nonwatertight configuration, comprising:
   a casing provided with fitting ribs; and
   a cover including a pair of clearance-filling ribs having a recessed configuration in section view, the clearance-filling ribs being on a peripheral wall of the cover and projecting toward the casing,
   wherein for the watertight configuration, a rubber packing mounts on an inner surface of the peripheral wall of the cover; and
   wherein for the nonwatertight configuration, engagement of the clearance-filling ribs and the fitting ribs restricts rattling between the casing and the cover when the rubber packing is not mounted on the inner surface of the peripheral wall of the cover.

2. The electrical junction box according to claim 1, wherein the clearance-filling ribs are provided on a locking side of the cover at opposite sides of a lock piece, the lock piece being provided on the cover to lock the casing.

3. The electrical junction box according to claim 1,
   wherein a tongue piece projects toward the casing from a side of the cover opposing the locking side of the cover,
   wherein a frame portion projects from an outer surface of the casing and the tongue piece enters the frame portion with a first clearance,
   wherein when an air pressure in an internal space sealed by locking engagement between the cover and the casing increases, the tongue piece is displaced in the frame portion to form a second clearance for exhausting the internal air between the cover and the casing.

4. The electrical junction box according to claim 1, further comprising:
   an electrical element detachably connected to the casing through an opening in the casing, the electrical element being coupled to terminals connected to ends of electrical wires contained in the casing,
   wherein the casing is provided with an electrical element-containing section in which a watertight treatment is applied to the terminals, and
   wherein the electrical element includes a single fuse or relay accommodated in said electrical element-containing section.

* * * * *